United States Patent
Yoshizumi

(10) Patent No.: US 10,452,354 B2
(45) Date of Patent: Oct. 22, 2019

(54) AGGREGATED MULTI-OBJECTIVE OPTIMIZATION

(71) Applicant: INTERNATIONAL BUSINESS MACHINES CORPORATION, Armonk, NY (US)

(72) Inventor: Takayuki Yoshizumi, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 15/210,658

(22) Filed: Jul. 14, 2016

(65) Prior Publication Data
US 2018/0018145 A1 Jan. 18, 2018

(51) Int. Cl.
*G06F 7/08* (2006.01)
*G06F 7/02* (2006.01)
*G06N 5/02* (2006.01)

(52) U.S. Cl.
CPC ............... *G06F 7/02* (2013.01); *G06F 7/08* (2013.01); *G06N 5/02* (2013.01)

(58) Field of Classification Search
CPC ............... G06F 7/02; G06F 7/08; G06N 5/02
See application file for complete search history.

(56) References Cited

U.S. PATENT DOCUMENTS

| | | | |
|---|---|---|---|
| 5,742,590 A | 4/1998 | Lin et al. | |
| 7,139,741 B1 * | 11/2006 | Benjamin | G06N 5/04 706/45 |
| 7,406,053 B2 | 7/2008 | Cheung et al. | |
| 8,542,869 B2 | 9/2013 | He et al. | |
| 8,839,913 B2 | 9/2014 | Atalla et al. | |
| 8,914,300 B2 | 12/2014 | Sustaeta et al. | |
| 2012/0232959 A1 * | 9/2012 | Subramanian | G06Q 10/04 705/7.35 |
| 2014/0180992 A1 * | 6/2014 | Lingenfelder | G06N 99/005 706/46 |
| 2015/0227848 A1 | 8/2015 | Amid et al. | |

(Continued)

FOREIGN PATENT DOCUMENTS

CN 103488851 A 1/2014

OTHER PUBLICATIONS

Ganguly, S. et al., "Multi-objective planning of electrical distribution systems using dynamic programming," Electrical Power and Energy Systems, vol. 46, Mar. 2013. (pp. 1-3).

(Continued)

*Primary Examiner* — Chuong D Ngo
(74) *Attorney, Agent, or Firm* — Tutunjian & Bitetto, P.C.; Vazken Alexanian

(57) ABSTRACT

Groups of metrics to form objective functions may be generated by obtaining a judgment that represents whether a first subject is comparable to a second subject, obtaining a plurality of evaluation values for each of the first subject and the second subject, each evaluation value corresponding to a metric among a plurality of metrics, comparing, for each metric, a corresponding evaluation value of a first subject to a corresponding evaluation value of the second subject, and generating one or more groups based on a result of the comparison and the judgment, each group of the one or more groups including at least one metric of the plurality of metrics, wherein metrics in each group are determined to be comparable with respect to evaluating subjects.

25 Claims, 7 Drawing Sheets

(56) References Cited

U.S. PATENT DOCUMENTS

2017/0011292 A1* 1/2017 Thompson ............. G06N 3/126
2017/0316079 A1* 11/2017 Lu ..................... G06F 17/30598

OTHER PUBLICATIONS

Goldfarb, D. et al., "Fast Alternating Linearization Methods for Minimizing the Sum of Two Convex Functions," Mathematical Programming, vol. 141, Issue 1, Oct. 2013. (pp. 1-28).

Mlakar, M. et al., "Comparing Solutions under Uncertainty in Multiobjective Optimization," Mathematical Problems in Engineering, vol. 2014, May 2014. (pp. 1-11).

Yoshizumi, T. et al., "A mathematical programming-based approach to determining objective functions from qualitative and subjective comparisons," AAAI'15 Proceedings of the Twenty-Ninth AAAI Conference on Artificial Intelligence, Jan. 2015. (pp. 1-7).

List of IBM Patents or Patent Applications Treated as Related dated Jul. 14, 2016.

Grodzevich, O. et al., "Normalization and other topics in multi-objective optimization" Proceedings of the Fields—MITACS Industrial Problems Workshop (Aug. 2006) pp. 89-101.

Wieczorek, M. et al., "Bi-criteria Scheduling of Scientific Workflows for the Grid" Eighth IEEE International Symposium on Cluster Computing and the Grid (CCGRID) (May 2008) pp. 9-16.

\* cited by examiner

| Metrics | First Subject | Second Subject |
|---|---|---|
| $x_1$ | 0.61 | 0.55 |
| $x_2$ | 0.72 | 0.65 |
| $x_3$ | 0.60 | 0.58 |
| ⋮ | ⋮ | ⋮ |
| Judgement | | |
| Evaluator 1 | The first subject is slightly better than the second subject (Comparable) | |
| ⋮ | ⋮ | |

FIG. 4

| Metrics | First Subject | Second Subject |
|---|---|---|
| $x_1$ | 0.76 | 0.89 |
| $x_2$ | 0.52 | 0.62 |
| $x_3$ | 0.83 | 0.46 |
| ⋮ | ⋮ | ⋮ |
| Judgement | | |
| Evaluator 1 | Incomparable | |
| ⋮ | ⋮ | |

FIG. 5

AGGREGATED MULTI-OBJECTIVE OPTIMIZATION

BACKGROUND

Technical Field

The present invention relates to aggregation of objective terms into groups.

Description of the Related Art

A single-objective optimization and a multi objective optimization have been used for solving optimization problems. The single-objective optimization aggregates all objective terms into a single objective function and may provide a single optimized solution as disclosed for example in "A Mathematical Programming-based Approach to Determining Objective Functions from Qualitative and Subjective Comparisons," Takayuki Yoshizumi, AAAI '15 Proceedings of Twenty-Ninth AAAI Conference on Artificial Intelligence, 2015. However, some terms (e.g., time and cost) may have a relationship that is incomparable. In such cases, the single objective optimization may provide a solution optimized from a single viewpoint, and thus may not provide solutions optimized for a plurality of terms (e.g., a solution optimized for time or a solution optimized for cost).

Meanwhile, a multi-objective optimization may provide a set of Pareto solutions, each of which corresponds to an objective term among all objective terms. Since the multi-objective optimization may potentially provide a great number of optimized solutions, it may require much time and resources to evaluate all optimized solutions.

SUMMARY

According to a first aspect of the present invention, provided is a generating apparatus including a processor and one or more computer readable mediums collectively including instructions that, when executed by the processor, cause the processor to obtain a judgment that represents whether a first subject is comparable to a second subject, obtain a plurality of evaluation values for each of the first subject and the second subject, each evaluation value corresponding to a metric among a plurality of metrics, compare, for each metric, a corresponding evaluation value of a first subject to a corresponding evaluation value of the second subject, and generate one or more groups based on a result of the comparison and the judgment, each group of the one or more groups including at least one metric of the plurality of metrics, wherein metrics in each group are determined to be comparable with respect to evaluating subjects. The first aspect may also include a method implemented by the apparatus and a program product for performing the method. According to the first aspect, the generating apparatus may generate groups of metrics based on judgements and evaluation values of subjects, such that each group includes metric values of which may be compensable within the group.

According to a second aspect of the present invention, provided is the generating apparatus of the first aspect wherein the comparison calculates a plurality of differences between the plurality of evaluation values of the first subject and the plurality of evaluation values of the second subject. According to the second aspect, the generating apparatus may generate groups of metrics based on judgements and signs of evaluation values of subjects, such that each group includes metric values of which may be compensable within the group.

According to a third aspect of the present invention, provided is the generating apparatus of the second aspect, wherein the generation of one or more groups includes adding at least one pair of metrics in different groups in response to a condition that signs of differences corresponding to the at least one pair of metrics are different and the judgment indicates that the first subject is incomparable to the second subject. According to the third aspect, the generating apparatus may generate groups of metrics based on judgements and signs of evaluation values of subjects, such that each group includes metric values of which may be compensable within the group.

According to a fourth aspect of the present invention, provided is the generating apparatus of the third aspect wherein the generation of one or more groups further includes generating a first constraint that the total number of pairs of metrics in a group, each pair of metrics having a metric corresponding to a positive difference and a metric corresponding to a negative difference is not more than the number of combinations of a metric corresponding to a positive difference and a metric corresponding to a negative difference minus a minimum of the number of metrics corresponding to a positive difference and the number of metrics corresponding to a negative difference. According to the fourth aspect, the generating apparatus may generate groups of metrics by generating constraints based on judgements and signs of evaluation values of subjects, such that each group includes metric values of which may be compensable within the group.

According to a fifth aspect of the present invention, provided is the generating apparatus of the fourth aspect, wherein the generation of one or more groups further includes solving an integer programming problem including the first constraint. According to the fifth aspect, the generating apparatus may generate groups of metrics based on judgements and evaluation values of subjects by a solver.

According to a sixth aspect of the present invention, provided is the generating apparatus of the first aspect, wherein the generation of one or more groups includes adding each metric corresponding to a difference having a first sign in a group with a metric corresponding to a difference having an opposite sign of the first sign in response to a condition that the judgment indicates that the first subject and the second subject are comparable. According to the sixth aspect, the generating apparatus may generate groups of metrics based on evaluation values of pairs of subjects which are comparable.

According to a seventh aspect of the present invention, provided is the generating apparatus of the sixth aspect of the sixth aspect wherein the generation of one or more groups further includes generating, in response to a condition that the judgment indicates that the first subject is incomparable to the second subject, a second constraint that for each metric corresponding to a difference having the first sign, the total number of metrics in a group corresponding to a difference having an opposite sign of the first sign is not less than one, wherein the first sign is one of positive and negative. According to the seventh aspect, the generating apparatus may generate groups of metrics by generating constraints based on evaluation values of pairs of subjects which are comparable.

According to an eighth aspect of the present invention, provided is the generating apparatus of the seventh aspect, wherein the generation of one or more groups further includes solving an integer programming problem including the second constraint. According to the eighth aspect, the generating apparatus may generate groups of metrics by solving constraints generated based on evaluation values of pairs of subjects which are comparable.

According to a ninth aspect of the present invention, provided is the generating apparatus of the first aspect, wherein the generation of one or more groups includes generating a third constraint that a first metric and a second metric must be in a group if the first metric and the third metric are in the group, and the second metric and the third metric are in the group. According to the ninth aspect, the generating apparatus may more accurately generate groups of metrics based on the possible number of edges of groups of metrics.

According to a tenth aspect of the present invention, provided is the generating apparatus of the first aspect, wherein the instructions further cause the processor to create one or more objective functions, each function corresponding to a group among the one or more groups, each objective function includes each metric included in a corresponding group. According to the tenth aspect, the generating apparatus may generate objective functions that may explain the relationship between the judgements and evaluation values of the subjects based on the groups of metrics.

According to an eleventh aspect of the present invention, provided is the generating apparatus of the tenth aspect, wherein the judgment further represents a relative evaluation between the first subject and the second subject in response to a condition that the first subject is comparable to the second subject, and the one or more objective functions are created by further using a plurality of the judgments for a plurality of subjects. According to the eleventh aspect, the generating apparatus may generate objective functions based on the relative evaluation of the subjects.

According to an twelfth aspect of the present invention, provided is the generating apparatus of the tenth aspect, wherein the generation of one or more groups includes generating a forth constraint that, for all objective functions, differences of output values between the first subject and the second subject have the same sign. According to the twelfth aspect, the generating apparatus may create objective functions based on constraints relating to the difference of output values of objective functions between the subjects.

According to a thirteenth aspect of the present invention, provided is the generating apparatus of the tenth aspect, wherein the generation of one or more groups includes generating a fifth constraint that, a difference of output values between the first subject and the second subject for a first object function has an opposite sign to a difference of output values between the pair of subjects for a second objective function. According to the thirteenth aspect, the generating apparatus may create objective functions based on constraints relating to the difference of output values of objective functions between the subjects.

The summary clause does not necessarily describe all features of the embodiments of the present invention. Embodiments of the present invention may also include sub-combinations of the features described above.

BRIEF DESCRIPTION OF THE DRAWINGS

FIG. 4 shows an example of subjects and a judgement thereof, according to an embodiment of the present invention.

FIG. 5 shows another example of subjects and a judgement thereof, according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
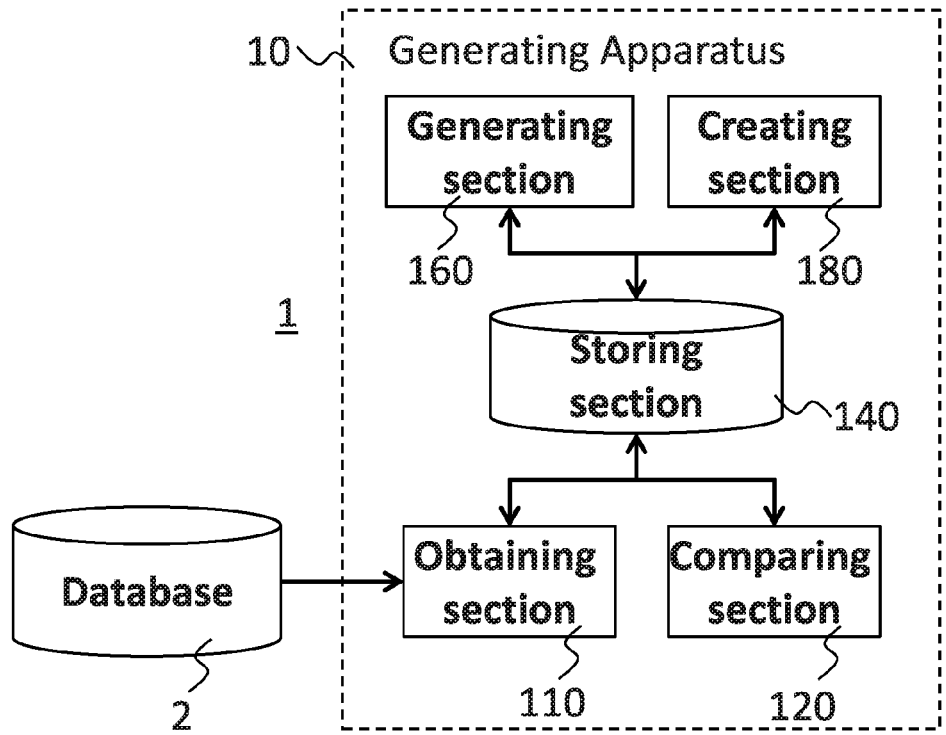
FIG. 1 shows an exemplary configuration of a system 1, according to an embodiment of the present invention.

FIG. 1 shows an exemplary configuration of a system 1 according to an embodiment of the present invention. The system 1 may group metrics into groups, and generate objective functions according to the groups. The system 1 may comprise a database 2 and a generating apparatus 10.

The database 2 may store data of judgements of pairs of subjects. In one embodiment, the database 2 may store a plurality of judgments for a plurality of pairs of subjects. Each judgement represents whether a first subject is comparable to a second subject. For example, one or more evaluators may select at least some pairs of the subjects among all possible pairs of the subjects, and, for each pair, evaluate the pair of subjects and provide a judgement indicating whether the pair of subjects is comparable or incomparable In one embodiment, the database 2 may also store an indication of which of the first subject and the second subject is superior to the other. In the embodiment, the database 2 may store a judgement indicating which subject is superior to the other, for each pair of subjects which is comparable, as a part of the judgement. The database 2 may further store a degree to which one subject is superior to the other as a part of the judgement. The database 2 may store the plurality of judgements for the plurality of pairs of the subjects provided by the evaluator(s).

Each subject may correspond to a solution for the optimization problem. The subject may be represented by a plurality of evaluation values, each evaluation value corresponding to a metric among a plurality of metrics. Each metric may represent a feature of a solution. In one embodiment, a solution may correspond to how to pack medical instruments into a box, and metrics may correspond to a filling rate, an aspect ratio, a sterilization manageability, etc. given by the solution. In one embodiment, the metrics may represent at least part of the solution (e.g., features relating to how to pack the instruments).

The database 2 may also store data of a plurality of evaluation values for each of the plurality of subjects. The database 2 may provide the generating apparatus 10 with the stored data. In one embodiment, the database 2 may be implemented in the generating apparatus 10.

The generating apparatus 10 may comprise a processor and one or more computer readable mediums collectively including instructions. The instructions, when executed by the processor, may cause the processor to operate as a plurality of operating sections. Thereby, the generating apparatus 10 may be regarded as comprising an obtaining section 110, a comparing section 120, a storing section 140, a generating section 160, and a creating section 180.

The obtaining section 110 may obtain a judgment and evaluation values for each of a plurality of pairs of subjects. In one embodiment, the obtaining section 110 may obtain a judgment that represents whether a first subject in a pair of subjects is comparable to a second subject in the pair from the database 2. The obtaining section 110 may also obtain a plurality of evaluation values for each of the first subject and the second subject from the database 2. The obtaining section 110 may store the plurality of judgement and the plurality of evaluation values for each of the pairs in the storing section 140.

The comparing section 120 may compare, for each metric, a corresponding evaluation value of a first subject to a corresponding evaluation value of the second subject. In one embodiment, the comparing section 120 may obtain evaluation values of the first subject and the second subject of the plurality of pairs from the storing section 140, and calculate a plurality of differences between the plurality of evaluation values of the first subject and the plurality of evaluation values of the second subject, for each of the plurality of pairs. The comparing section 120 may store the result of the calculation in the storing section 140.

The storing section 140 may store data used for operations of the generating apparatus 10. At least a part of the storing section 140 may be implemented by a volatile or non-volatile memory.

The generating section 160 may generate one or more groups of metrics based on a result of the comparison by the comparing section 120 and the judgment obtained by the obtaining section 110. In one embodiment, the generating section 160 may obtain judgements for the plurality of pairs of subjects and the results of comparison for the plurality of pairs, and generate one or more groups of metrics, such that each group of the one or more groups includes at least one metric among the plurality of metrics, wherein metrics in each group are determined to be comparable with respect to evaluating subjects. Further details of the generation of the groups are explained below. The generating section 160 may store information of generated groups (e.g., information of metric(s) allocated to each group) in the storing section 140.

The creating section 180 may create one or more objective functions at least partially based on the groups generated by the generating section 160. In one embodiment, the creating section may obtain information of groups from the database 2 and generate one or more objective functions, such that each objective function corresponds to a group among the one or more groups, and each objective function includes each metric included in a corresponding group. Further details of the creation of the objective functions are explained below. The creating section 180 may store information of generated objective functions into the storing section 140.

Figure 2:
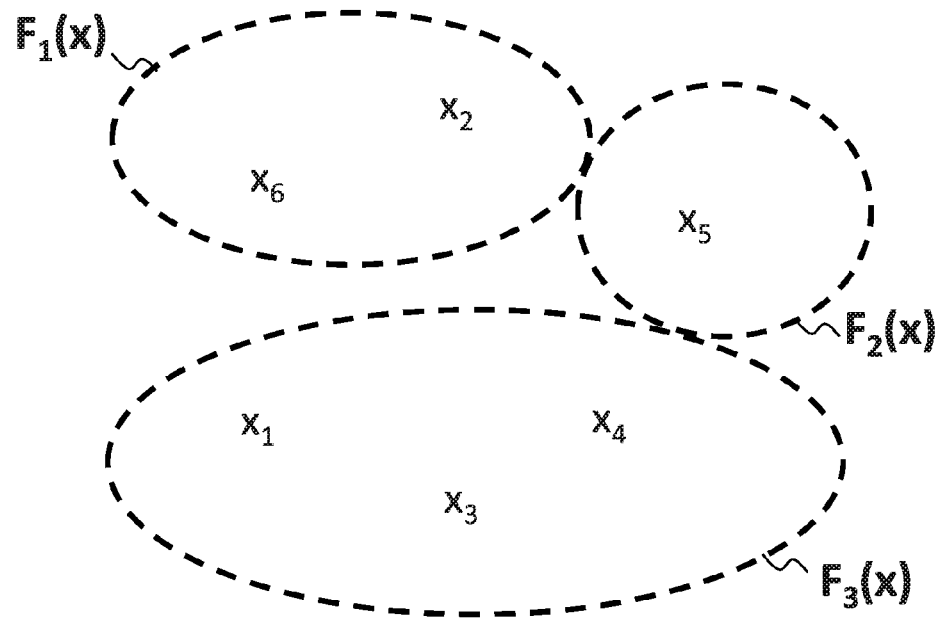
FIG. 2 shows metrics and objective functions, according to an embodiment of the present invention.

FIG. 2 shows metrics and objective functions, according to an embodiment of the present invention. In FIG. 2, 6 metrics are shown as $x_1$, $x_2$, $x_3$, $x_4$, $x_5$ and $x_6$. The conventional single-objective optimization may present a single objective function comprising $x_1$, $x_2$, $x_3$, $x_4$, $x_5$ and $x_6$ to provide a single optimized solution. The single-objective optimization may not provide at least some solutions that the evaluator may consider as a part of the optimized solutions. This is because the single objective optimization may essentially treat all metrics as compensable by other metrics, while the evaluator may not think that at least some metrics are not compensable by the other metrics. Thus, the single objective optimization may discard solutions that cannot be determined to be superior to or inferior to the single optimized solution by the evaluator.

For example, in a case where solutions represent contents of meals, a metric $x_1$ may represent a cost of a meal and a metric $x_2$ may represent the number of foods in the meal. An evaluator may not determine which solution is superior to the other among a first solution providing a large number of foods with a high cost, and a second solution providing the small number of foods with a low cost, because the first and second solutions have no compensable advantage or disadvantage against the other. Such solutions may be considered "incomparable."

The conventional multi-objective optimization may present 6 objective functions, each comprising each of $x_1$, $x_2$, $x_3$, $x_4$, $x_5$ and $x_6$ to provide a great number of optimized solutions on a Pareto surface of a 6-dimensional space. The multi-objective optimization may provide solutions that can be determined to be inferior to the other optimized solutions by the evaluator.

For example, in a case where solutions represent contents of meals, a metric $x_3$ may represent a weight of each food in a meal and a metric $x_2$ may represent the number of foods in the meal. In the example, an evaluator may determine which solution is superior to the other among a first solution providing a decent number of foods, each of which have a large weight, and a second solution providing the largest number of foods, each of which have a very small weight, based on a total weight of foods in both solutions. This is because the metric $x_1$ and $x_3$ (i.e., the number and weight of foods) may be compensable. Such solutions may be considered as "comparable."

A multi-objective optimization may sometimes optimize too many solutions because multi-objective optimization provides all optimized solutions in terms of optimization of all metrics.

However, in embodiments of the present invention, a generating apparatus, such as the generating apparatus 10, may generate 3 objective functions shown as $F_1(x)$, $F_2(x)$, and $F_3(x)$ as shown in FIG. 2. In the embodiment, the metrics $x_2$ and $x_6$ form a group corresponding to the objective function $F_1(x)$. The objective function $F_1(x)$ may be represented as: $F_1(x)=w_2x_2+w_6x_6$, where $w_2$ and $w_6$ are weights for the metrics $x_2$ and $x_6$. The metric $x_5$ forms a group corresponding to the objective function $F_2(x)$. The objective function $F_2(x)$ may be represented as: $F_2(x)=w_5x_5$, where $w_5$ is a weight for the metrics $x_5$. The metrics $x_1$, $x_3$ and $x_4$ form a group corresponding to the objective function $F_3(x)$. The objective function $F_3(x)$ may be represented as: $F_3(x)=w_1x_1+w_3x_3+w_4x_4$, where $w_1$, $w_3$ and $w_4$ are weights for the metrics $x_1$, $x_3$, and $x_4$.

According to the embodiment, the 3 objective functions may provide a plurality of optimized solutions on a Pareto surface of a 3-dimensional space. The number of the optimized solutions according to the embodiments may be far less than the number of the optimized solutions obtained by the multi-objective optimization. Since the generating apparatus generates the groups based on the judgements of comparability of the metrics, the 3 objective functions may provide optimized solutions having an incomparable relationship to each other without providing optimized solutions having a comparable relationship to each other.

Therefore, the generating apparatus may reduce the number of optimized solutions to be handled without discarding essentially necessary solutions.

Figure 3:
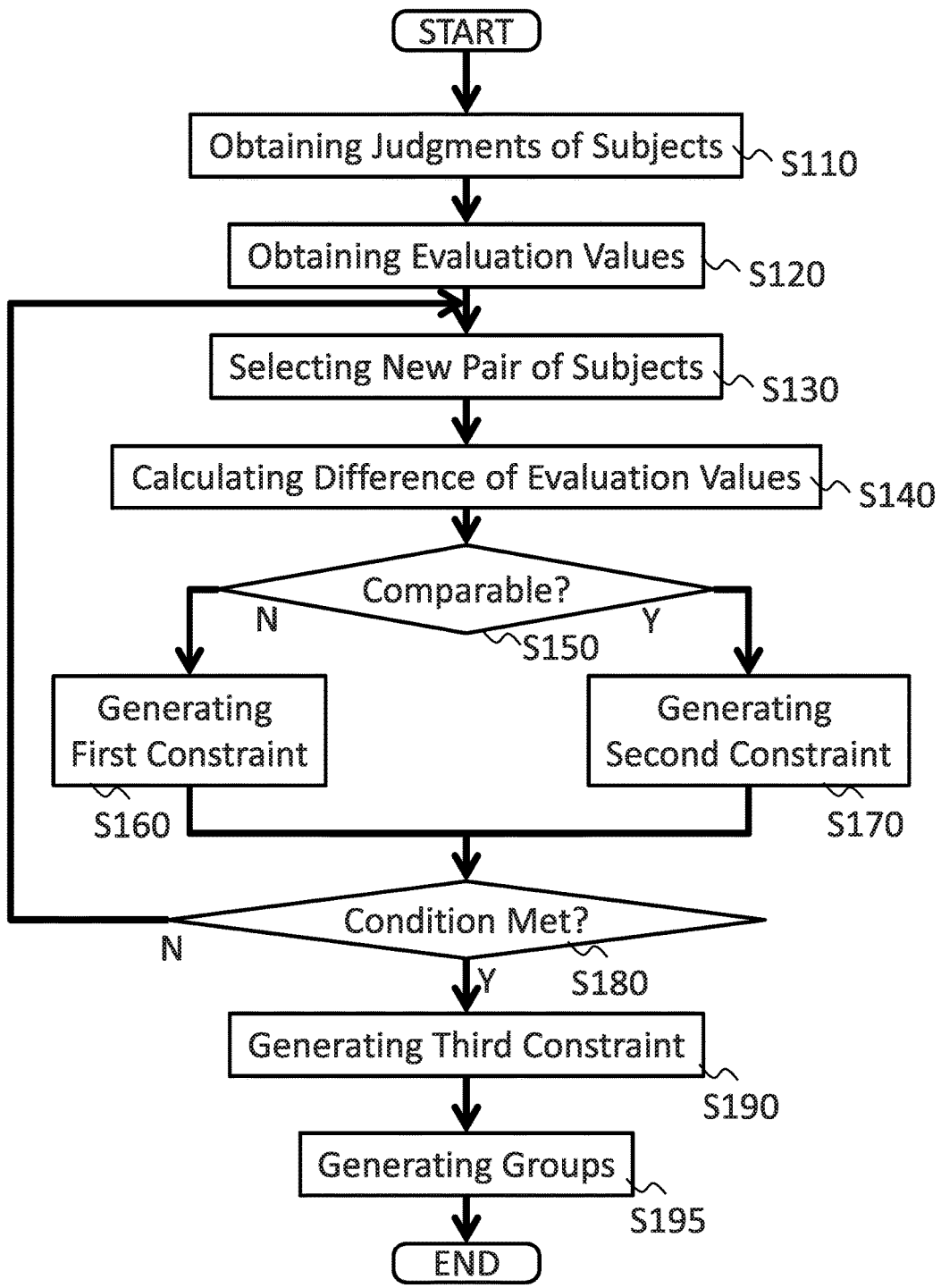
FIG. 3 shows the first operational flow according to an embodiment of the present invention.

FIG. 3 shows the first operational flow according to an embodiment of the present invention. The present embodiment describes an example in which a generating apparatus, such as the generating apparatus 10, performs the operations from S110 to S195, as shown in FIG. 3. The generating apparatus may generate one or more groups by performing the operations of S110-S195.

At S110, an obtaining section, such as the obtaining section 110, may obtain a plurality of judgments for a plurality of pairs of subjects from a database, such as the database 2. Each judgement may represent whether subjects of a pair are comparable or incomparable. In one embodiment, the obtaining section may obtain a judgement for pair 1, pair 2, . . . , pair P, where P is the number of pairs given judgements.

In one embodiment, the obtaining section may obtain a judgement that a first subject and a second subject in a pair p (p∈P) are either comparable or incomparable.

In one embodiment, the obtaining section may further obtain judgement as to which subject is superior to the other if the subjects in the pair are comparable. In the embodiment, the obtaining section may obtain a judgment further representing a relative evaluation between the first subject and the second subject in response to a condition that the first subject is comparable to the second subject. In the embodiment, each judgement may further represent information of a degree to which the one subject in a pair is superior to the other in the pair.

In one embodiment, the obtaining section may obtain information of the relative evaluation between the first subject and the second subject evaluated in two levels. In the embodiment, the obtaining section may obtain a judgement that a first subject and a second subject in a pair p are comparable, and that the first subject is slightly superior to the second subject. In the embodiment, the obtaining section may obtain a judgement that a first subject and a second subject in a pair p are comparable, and that the first subject is significantly superior to the second subject. The obtaining section may store the judgement(s) in a storing section such as the storing section 140.

Next at S120, the obtaining section may obtain a plurality of evaluation values for each of the subjects in the plurality of pairs. In one embodiment, the obtaining section may obtain evaluation values $x_1^{(i)}, x_2^{(i)}, \ldots, x_L^{(i)}$ of metrics $x_1, x_2, \ldots, x_L$ of a subject i of the pair p and evaluation values $x_1^{(j)}, x_2^{(j)}, \ldots, x_L^{(j)}$ of a subject j of the pair p, where L is the number of metrics. In one embodiment, the obtaining section may obtain evaluation values for subjects in pairs, of which judgements are obtained at S110. The obtaining section may store the plurality of evaluation values in the storing section.

FIG. 4 shows an example of subjects and a judgement thereof, according to an embodiment of the present invention. FIG. 4 shows evaluation values metrics $x_1, x_2, x_3, \ldots$ for a first subject and a second subject. In the embodiment, the evaluation values $x_1^{(1)}, x_2^{(1)}, x_3^{(1)}, \ldots$ of the first subject are 0.61, 0.72, 060, . . . , and the evaluation values $x_1^{(2)}, x_2^{(2)}, x_3^{(2)}, \ldots$ of the first subject are 0.55, 0.65, 058 . . . .

FIG. 4 also shows a judgement given to the pair of the first subject and the second subject. In the embodiment, the evaluator 1 may give the pair a judgment that the first subject is slightly better than the second subject. This judgement may indicate that the first subject and the second subject are comparable.

FIG. 5 shows another example of subjects and a judgement thereof, according to an embodiment of the present invention. FIG. 5 also shows evaluation values metrics $x_1, x_2, x_3, \ldots$ and a judgement for the first subject and the second subject. In the embodiment, the evaluator 1 may give the pair a judgment that the first subject and the second subject are incomparable.

Next at S130, a comparing section such as the comparing section 120 may select a new pair from the plurality of pairs (e.g., P pairs), of which judgements are obtained at S110 and of which evaluation values are obtained at S120. Hereinafter, the selected pair may be referred as the "object pair", and subjects in the object pair are referred to as a first subject and a second subject.

Next at S140, the comparing section may calculate a plurality of differences between the plurality of evaluation values of the first subject in the object pair and the plurality of evaluation values of the second subject in the object pair. In one embodiment, the comparing section may calculate $x_1^{(i)}-x_1^{(j)}, x_2^{(i)}-x_2^{(j)}, x_3^{(i)}-x_3^{(j)}, x_4^{(i)}-x_4^{(j)}, x_5^{(i)}-x_5^{(j)}, x_6^{(i)}-x_6^{(j)}$ for the first subject i and the second subject j in the object pair, for 6 metrics. The calculation result of $x_1^{(i)}-x_1^{(j)}, x_2^{(i)}-x_2^{(j)}, x_3^{(i)}-x_3^{(j)}, x_4^{(i)}-x_4^{(j)}, x_5^{(i)}-x_5^{(j)}, x_6^{(i)}-x_6^{(j)}$ may be referred to as $\Delta x_1^{(ij)}, \Delta x_2^{(ij)}, \Delta x_3^{(ij)}, \Delta x_4^{(ij)}, \Delta x_5^{(ij)}, \Delta x_6^{(ij)}$. Hereinafter $\{\Delta x_1^{(ij)}, \Delta x_2^{(ij)}, \Delta x_3^{(ij)}, \Delta x_4^{(ij)}, \Delta x_5^{(ij)}, \Delta x_6^{(ij)}\}$ may be collectively represented by $\Delta x^{(ij)}$. The comparing section may store the calculation result in the storing section.

Next at S150, the generating section may determine whether a judgement for the object pair is comparable or incomparable. In one embodiment, the generating section may obtain the judgement for the object pair from the storing section. In response to a condition that the judgment indicates that the first subject is incomparable to the second subject, then the generating section may proceed with an operation of S160. In response to a condition that the judgment indicates that the first subject is comparable to the second subject, the generating section may proceed with an operation of S170.

During operations of S160-S170, the generating section may generate constraints used for generation of one or more of groups. Here, a concept of grouping according to an embodiment of the present invention is explained with FIGS. 6-9 before explaining details of the operations of S160-S170.

Figure 6:
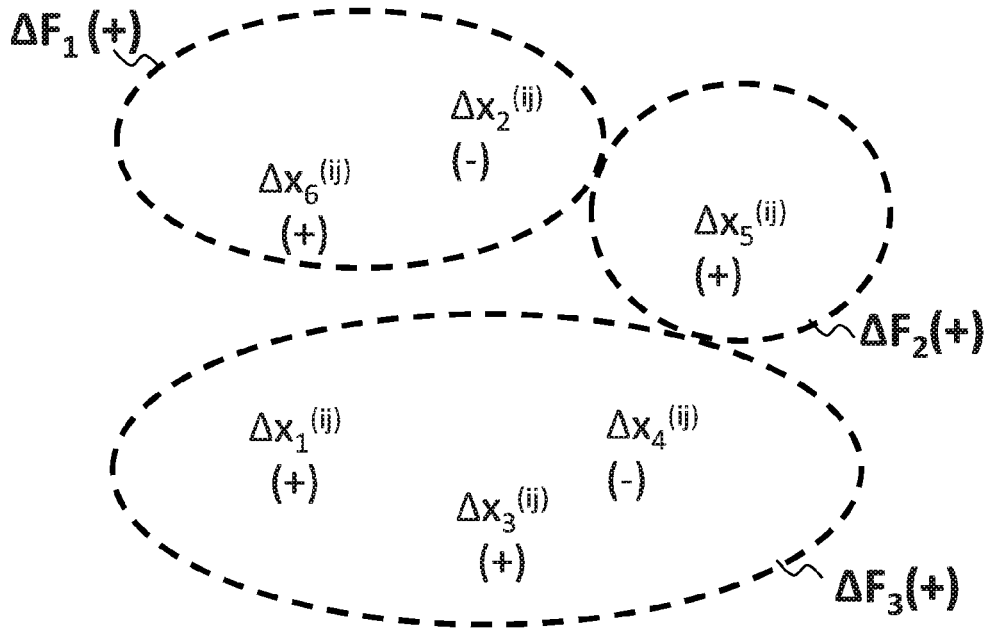
FIG. 6 shows differences of objective functions from comparable subjects, according to an embodiment of the present invention.

FIG. 6 shows differences of objective functions from comparable subjects, according to an embodiment of the present invention. In the embodiment of FIG. 6, it is presumed that a judgement for a pair of a subject i and a subject j is made based on an objective function $F_1(x), F_2(x)$ and $F_3(x)$ by an evaluator. In the embodiment, $F_1(x), F_2(x)$ and $F_3(x)$ are the same as those explained in relation to FIG. 2.

A difference between an output value of $F_1(x_2^{(i)}, x_6^{(i)})$ for the subject i and an output value of $F_1(x_2^{(j)}, x_6^{(j)})$ for the subject j is represented as $\Delta F_1$. A difference between an output value of $F_2(x_5^{(i)})$ for the subject i and an output value of $F_2(x_5^{(j)})$ for the subject j is represented as $\Delta F_2$. A difference between an output value of $F_3(x_1^{(i)}, x_3^{(i)}, x_4^{(i)})$ for the subject i and an output value of $F_3(x_1^{(j)}, x_3^{(j)}, x_4^{(j)})$ for the subject j is represented as $\Delta F_3$. FIG. 6 shows that $\Delta F_1$, $\Delta F_2$ and $\Delta F_3$ are all positive values (+), $\Delta x_1^{(ij)}$, $\Delta x_3^{(ij)}$, $\Delta x_5^{(ij)}$, and $\Delta x_6^{(ij)}$ are positive values (+), while $\Delta x_2^{(ij)}$ and $\Delta x_4^{(ij)}$ are negative values (−).

Objective functions having a positive difference (e.g., $\Delta F_1$, $\Delta F_2$ and $\Delta F_3$ of FIG. 6) may be hereinafter referred to as "positive objective functions." In the embodiment of FIG. 6, the evaluator may give a judgement that the subject i and the subject j are comparable, because the evaluator considers the subject i to be superior to the subject j from the viewpoints of all of the objective functions $F_1(x)$, $F_2(x)$, $F_3(x)$.

Figure 7:
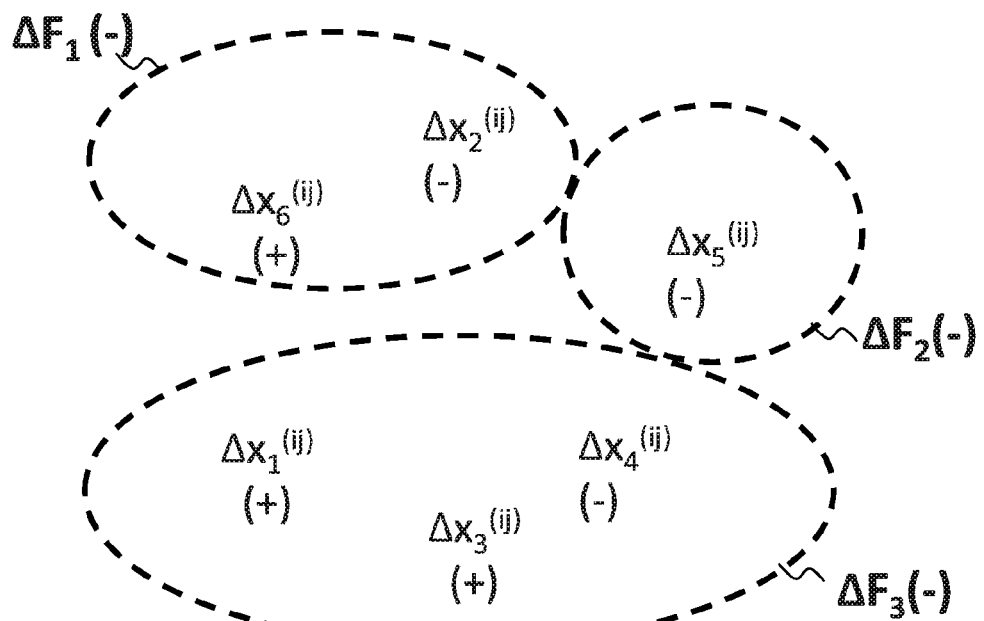
FIG. 7 shows differences of objective functions from comparable subjects, according to an embodiment of the present invention.

FIG. 7 shows differences of objective functions derived from comparable subjects, according to an embodiment of the present invention. In the embodiment, $F_1(x)$, $F_2(x)$ and $F_3(x)$ are the same as those explained in relation to FIG. 6. FIG. 7 shows that $\Delta F_1$, $\Delta F_2$ and $\Delta F_3$ are negative values (−), $\Delta x_1^{(ij)}$, $\Delta x_3^{(ij)}$, and $\Delta x_6^{(ij)}$ are positive values (+), while $\Delta x_2^{(ij)}$, $\Delta x_4^{(ij)}$ and $\Delta x_5^{(ij)}$ are negative values (−).

Objective functions having a negative difference (e.g., $\Delta F_1$, $\Delta F_2$ and $\Delta F_3$ of FIG. 7) may be hereinafter referred to as "negative objective functions." In the embodiment of FIG. 7, the evaluator may give a judgement that the subject i and the subject j are comparable, because the evaluator considers that the subject i is inferior to the subject j from the viewpoints of all of the objective functions $F_1(x)$, $F_2(x)$, $F_3(x)$.

Figure 8:
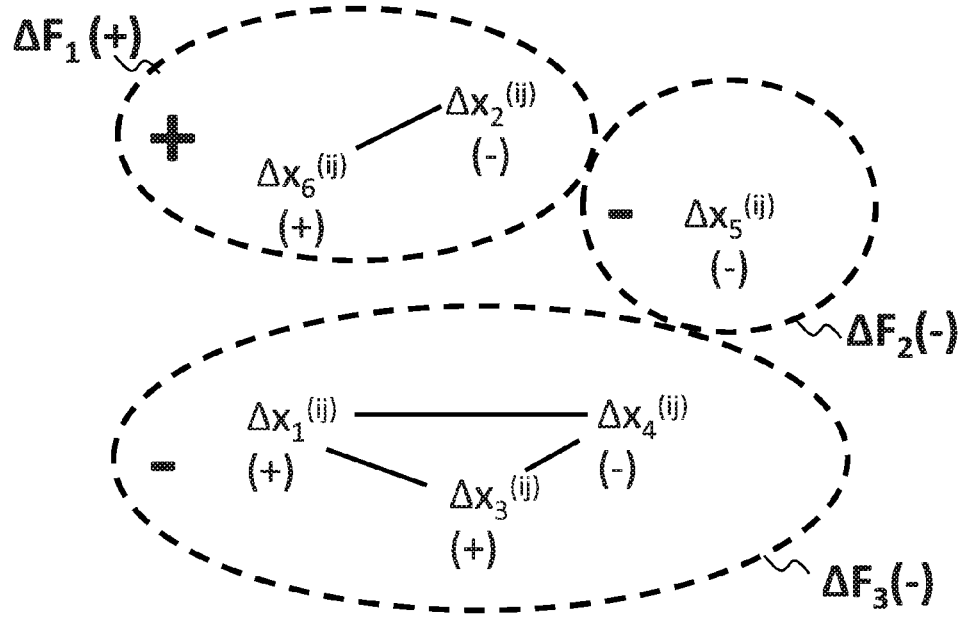
FIG. 8 shows differences of objective functions from incomparable subjects, according to an embodiment of the present invention.

FIG. 8 shows differences of objective functions from incomparable subjects, according to an embodiment of the present invention. In the embodiment, $F_1(x)$, $F_2(x)$ and $F_3(x)$ are the same as those explained in relation to FIGS. 6-7. As shown in FIG. 8, $\Delta F_1$ is a positive value (+) while $\Delta F_2$ and $\Delta F_3$ are negative values (−), and $\Delta x_1^{(ij)}$, $\Delta x_3^{(ij)}$, $\Delta x_6^{(ij)}$ are positive values (+), while $\Delta x_2^{(ij)}$, $\Delta x_4^{(ij)}$, $\Delta x_5^{(ij)}$ are negative values (−).

In the embodiment of FIG. 8, the evaluator may give a judgement that the subject i and the subject j are incomparable, because the evaluator considers that the subject i is superior to the subject j from a viewpoint of $F_1(x)$, but inferior from viewpoints of $F_2(x)$ and $F_3(x)$. In other words, since neither the subject i nor the subject j is absolutely superior to the other, the subject i and the subject j are considered to be incomparable.

FIG. 8 also shows edges between differences of evaluation values $\Delta x_1^{(ij)}, \ldots, \Delta x_6^{(ij)}$. The edges represent how metrics are grouped. In the embodiment, $\Delta x_2^{(ij)}$ and $\Delta x_6^{(ij)}$ are connected by an edge, and $\Delta x_1^{(ij)}$, $\Delta x_3^{(ij)}$, and $\Delta x_4^{(ij)}$ are connected by three edges. The generating section may generate constraints in relation to the number of edges for generating one or more of groups.

Figure 9:
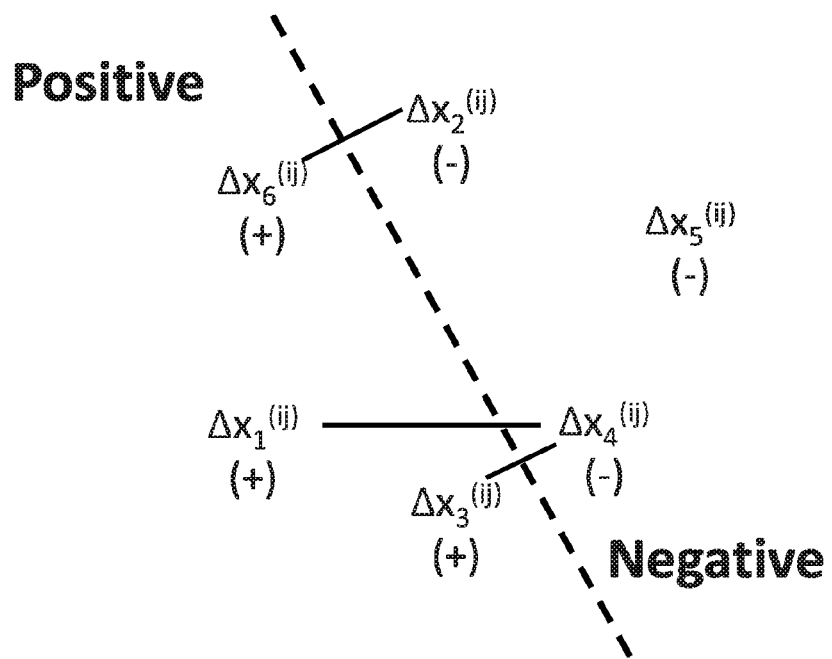
FIG. 9 shows edges between metrics, according to an embodiment of the present invention.

FIG. 9 shows edges between metrics, according to an embodiment of the present invention. Based on the judgement as to whether the subject i and the subject j are comparable or incomparable, the generating section may generate one or more edges between a metric of which difference of evaluation values are positive (e.g., $\Delta x_1^{(ij)}$, $\Delta x_3^{(ij)}$, and $\Delta x_6^{(ij)}$, which are hereinafter referred to as "positive metrics") and a metric of which difference of evaluation values are negative (e.g., $\Delta x_2^{(ij)}$, $\Delta x_4^{(ij)}$, and $\Delta x_5^{(ij)}$, which are hereinafter referred to as "negative metrics").

For example, if the subject i and the subject j are incomparable, then there should be at least one positive objective function $F_{k+}(x)$ having the positive difference $\Delta F_{k+}$ and at least one negative objective function $F_{k-}(x)$ having the negative difference $\Delta F_{k-}$ where k+ and k− are integers selected from $1 \ldots N$, and N is the number of objective functions.

Meanwhile, if each of all positive metrics is connected to all negative metrics, then there must be only one negative objective function or one positive objective function. This means that if the judgement is incomparable, then the number of edges between negative metrics and positive metrics should be less than the number of all possible edges between the positive metrics and the negative metrics minus the smaller of the number of positive metrics and the number of negative metrics so that each positive metric is not connected to all negative metrics.

On the other hand, if the subject i and the subject j are comparable, then there should be only positive objective functions or there should be only negative objective functions. This means that if the judgement is comparable, then the number of edges of each negative metric connected to the positive metrics should be at least 1, or the number of edges of each positive metric with negative metrics should be at least 1. During S160-180, the generating section may generate constraints to reflect at least part of the above explained relationships of the number of metrics and the judgements.

At S160, the generating section may generate a first constraint in which a total number of pairs of metrics in a group, each pair of metrics having a metric corresponding to a positive difference (e.g., $\Delta x_1^{(ij)}$, $\Delta x_3^{(ij)}$, and $\Delta x_6^{(ij)}$ in FIG. 9) and a metric corresponding to a negative difference (e.g., $\Delta x_2^{(ij)}$, $\Delta x_4^{(ij)}$, and $\Delta x_5^{(ij)}$ in FIG. 9) is not more than the number of combinations of a metric corresponding to a positive difference and a metric corresponding to a negative difference minus a minimum of the number of metrics corresponding to a positive difference and the number of metrics corresponding to a negative difference.

The first constraint is represented by the following formula (1):

$$\sum_{k \in S_{i,j}^{(+)}, l \in S_{i,j}^{(-)}} z_{k,l} \le |S_{i,j}^{(+)}||S_{i,j}^{(-)}| - \min(|S_{i,j}^{(+)}|, |S_{i,j}^{(-)}|), \quad (1)$$

where $S_{i,j}^{(+)}$ is a set of positive metrics for a pair including a subject i and a subject j, $S_{i,j}^{(-)}$ is a set of negative metrics for the same pair, and zu is a variable, which takes a value 1 when there exists an edge between a positive metric k and a negative metric l, and takes a value 0 when there is no edge between the positive metric k and the negative metric l. The generating section may proceed with an operation of S180.

At S170, the generating section may generate a second constraint that for each metric corresponding to a difference having the first sign, the total number of metrics in a group corresponding to a difference having an opposite sign of the first sign is not less than one, wherein the first sign is one of positive and negative. The second constraint is represented by the following formulae (2)-(4):

$$\sum_{l \in S_{i,j}^{(-)}} z_{k,l} \ge 1 - C(1 - y_{neg}) \text{ for } k^\forall \in S_{i,j}^{(+)}, \quad (2)$$

$$\sum_{k \in S_{i,j}^{(+)}} z_{k,l} \ge 1 - C(1 - y_{pos}) \text{ for } l^\forall \in S_{i,j}^{(-)}, \quad (3)$$

-continued $$y_{neg} + y_{pos} \geq 1, \quad (4)$$

where C is a constant value larger than 1 (e.g., a very large number such as 10,000). The generating section may proceed with an operation of S180.

At S180, the generating section may determine whether to end iterations of operations of S130-S180. In one embodiment, the generating section may determine whether the operations S130-180 have been completed for all pairs or a prescribed number of the plurality of pairs (e.g., P pairs) of metrics. If the condition is met, then the generating section may proceed with an operation of S190. If the condition is not met, then the generating section may go back to the operation of S130 to select a new pair, which has not been selected.

At S190, the generating section may generate a third constraint that a first metric and a second metric must be in a group if the first metric and the third metric are in the group, and the second metric and the third metric are in the group. The third constraint is represented by the following formula (5):

$$z_{k,l} + z_{k,m} + z_{m,l} \neq 2 \quad (5),$$

where (k, l, m) represents all combination of three metrics among all metrics. Therefore, the generating section may generate third constraints for $_MC_3$ combinations of 3 metrics from M metrics.

At S195, the generating section may generate one or more groups of metrics based on the constraints generated at the operations of S160, S170 and S190. In one embodiment, the generating section may generate one or more groups by solving an integer programming problem including all or at least a part of the first constraint, the second constraint, and the third constraint. The generating section may obtain a solution or approximate solution(s) of the integer programming problem by utilizing a solver (e.g., IBM ILOG CPLEX).

In one embodiment, the generating section may provide a plurality of possible solutions of groups of metrics to a user of the generating apparatus. For example, the generating section may generate a solution of groups $\{(x_1, x_3, x_4), (x_2, x_6), (x_5)\}$ and another solution of groups $\{(x_1, x_3, x_4), (x_2, x_6, x_5)\}$ by performing the operation of S195. In such an embodiment, the generating section may receive the final solution of groups from the user of the generating apparatus or the evaluator.

In one embodiment, the generating section may introduce one or more error terms in the constraints generated at the operations of S160, S170 and S190. Thereby, the generating section may allow errors for the existence of edges between metrics. In such embodiments, the generating section may solve the objective function that minimizes the number of errors.

By solving the integer programming problem, the generating section may determine a value of $z_{k,l}$ for each combination of a metric k and a metric l among the plurality of metric (M metrics), and thereby the generating section may generate one or more of groups of metrics. In one embodiment, the generating section may generate the groups by determining that a metric k and a metric l is in the same group if a value of $z_{k,l}$ is 1, for all pairs of metrics of the plurality of metrics.

As a result of performing the operations of FIG. 3, the generating section may add at least one pair of metrics in different groups in response to a condition that signs of differences corresponding to the at least one pair of metrics are different and the judgment indicates that the first subject is incomparable to the second subject based on the first constraint. The generating section may also add each metric corresponding to a difference having a first sign in a group with a metric corresponding to a difference having an opposite sign of the first sign in response to a condition that the judgment indicates that the first subject and the second subject are comparable based on the second constraint. The generating section may store information of generated groups in the storing section.

As described above, the generating apparatus may generate one or more groups of the plurality of metrics based on evaluation values of the metrics and the judgements as to comparability of pairs of subjects. Information of groups of metrics may be used for generating objective functions as a part of the constraints, as explained below.

Figure 10:
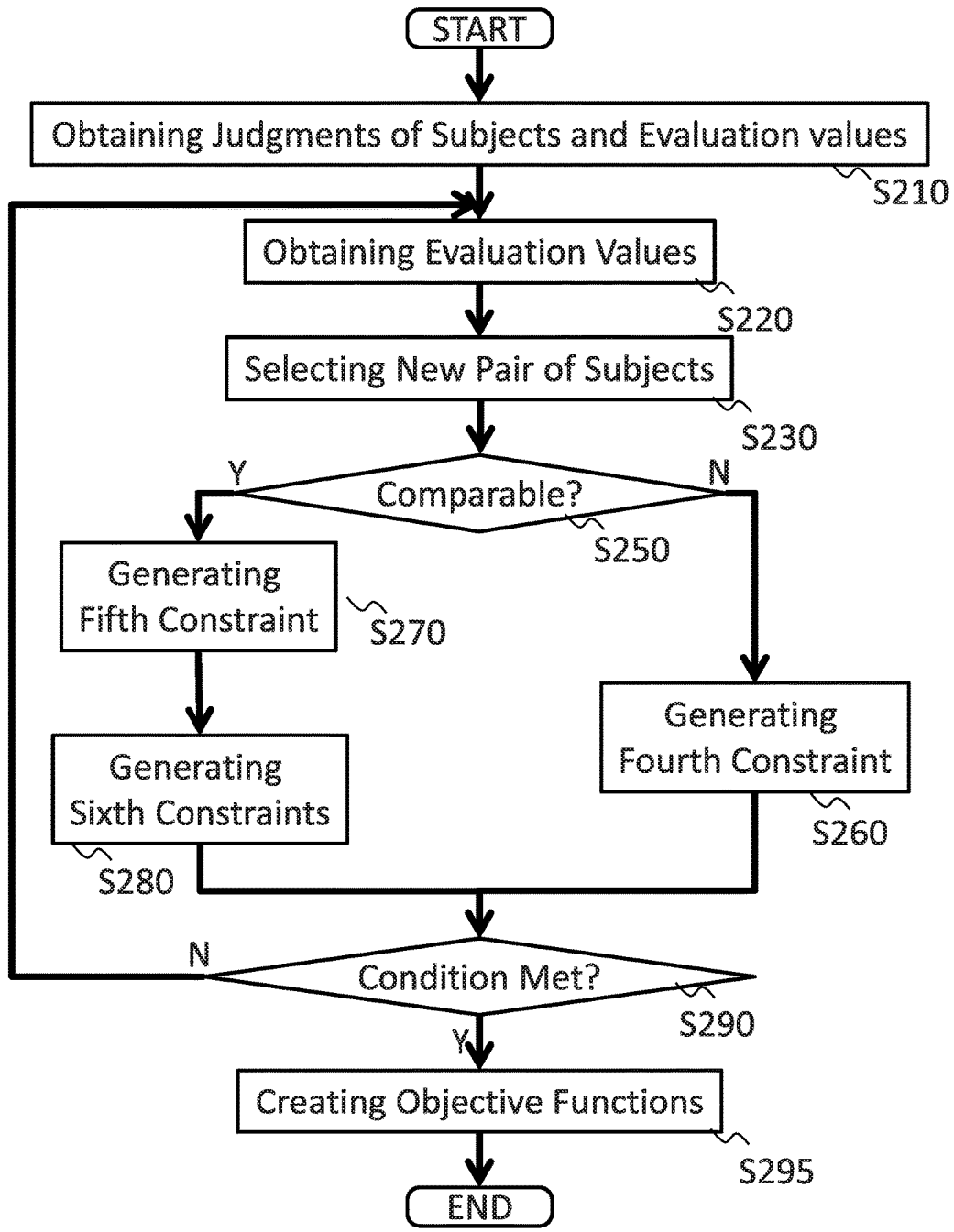
FIG. 10 shows the second operational flow according to an embodiment of the present invention.

FIG. 10 shows the second operational flow according to an embodiment of the present invention. The present embodiment describes an example in which a generating apparatus, such as the generating apparatus 10, performs the operations from S210 to S295, as shown in FIG. 10. The generating apparatus may create one or more objective functions by performing the operations of S210-S295. The operational flow of FIG. 10 may be performed after the one or more of groups of metrics are generated, for example by the operational flow described in relation to FIG. 3.

At S210, the obtaining section may obtain a plurality of judgements for a plurality of pairs of subjects from a database such as the database 2. The obtaining section may perform the operation of S210 in the same manner as the operation of S110.

The obtaining section may also obtain a plurality of evaluation values for each of the subjects in the plurality of pairs. The obtaining section may perform the operation of S210 in the same manner as the operation of S120. The generating apparatus may not perform the operation of S220 if the storing section has already stored the plurality of evaluation values and the judgements at S110-S120. The creating section uses the plurality of evaluation values and the judgements stored in the storing section for performing following operations.

At S220, a creating section such as the creating section 180 may generate a common constraint used for the creating of the objective functions. As a result of the operational flow of FIG. 3, the one or more groups of the metrics have been generated. Since each objective function corresponds to a group of the one or more groups of metrics, each objective function includes terms corresponding to metrics in each group. In one embodiment, if metrics $x_1$, $x_3$ and $x_4$ are included in a group, then one objective function $F_k(x)$ may be represented as $F_k(x) = w_{k,1}x_1 + w_{k,3}x_3 + w_{k,4}x_4$, where $w_{k,m}$ represents a weight value for the m-th metric $x_m$ in the k-th objective function.

The creating section may generate a common constraint to define the objective functions. The common constraint may be represented by the following formulae (6)-(8):

$$F_k(x^{(i)}) = \Sigma_{m \in m} w_{k,m} x_m^{(i)} \text{ for each } k \in N \quad (6),$$

$$\Sigma_{m \in M} w_{k,m} = 1 \text{ for each } k \in N \quad (7),$$

$$0 \leq w_{k,m} \leq y_{k,m} \text{ for each } k \in N \quad (8),$$

where constant values of $y_{k,m}$, for $k \in N$ and $m \in M$ are defined such that $y_{k,m}$, takes "1" when the k-th group includes the m-th metric and takes "0" when the k-th group does not include the m-th metric. In the embodiment of FIG. 8, the first objective function $F_1(x)$ includes the second metric $x_2$ and the sixth metric $x_6$, then $y_{1,2}$ and $y_{1,6}$ take 1 while $y_{1,1}$, $y_{1,3}$, $y_{1,4}$, $y_{1,5}$ take 0.

At S230, the creating section may select a new pair from the plurality of pairs (e.g., P pairs), of which judgements are obtained at S210 and of which evaluation values are obtained at S220. Hereinafter, the selected pair may be referred as the object pair, and subjects in the new pair may be referred to as a first subject and a second subject.

At S250, the creating section may determine whether a judgement for the object pair is comparable or incomparable. In one embodiment, the generating section may obtain the judgement for the object pair from the storing section. The creating section may perform the determination in the same manner as the operation of S150. The creating section may proceed with an operation of S260 in response to a condition that the first subject is incomparable to the second subject, and proceed with an operation of S270 in response to a condition that the first subject is comparable to the second subject.

In the operations of S260-S280, the creating section may generate constraints for the object pair selected at the latest S230.

At S260, the creating section may generate a fourth constraint representing that, for all objective functions, differences of output values between the first subject and the second subject have the same sign in response to a condition that the judgement of the first subject and the second subject is "comparable." The fourth constraint may guarantee that differences of all objective functions for the first subject and the second subject are positive. The fourth constraint may be represented by a following formula (9):

$$\Delta F_k(x^{(i,j)}) \geq 0 \text{ for each } k \in N \quad (9),$$

where $\Delta F_k(x^{(i,j)}) \equiv F_k(x^{(i)}) - F_k(x^{(j)})$, $F_k(x^{(i)})$ represents an output value of the k-th objective function for the evaluation value of the first subject i, the first subject i being superior to the second subject j according to the judgement of the object pair, N being the number of the groups of metrics (i.e., the number of the objective functions). The creating section may proceed with an operation of S290.

At S270, the creating section may generate a fifth constraint that, a difference of output values between the first subject and the second subject for a first object function has an opposite sign to a difference of output values between the pair of subjects for a second objective function in response to a condition that the judgement of the first subject and the second subject is "incomparable." The fifth constraint may be represented by following formulae (10)-(13):

$$\Delta F_k(x^{(i,j)}) > -C(1-z_{i,j,k}^{(+)}) \text{ for each } k \in N \quad (10),$$

$$\Delta F_k(x^{(i,j)}) < -C(1-z_{i,j,k}^{(-)}) \text{ for each } k \in N \quad (11),$$

$$\Sigma_k z_{i,j,k}^{(+)} \geq 1 \quad (12),$$

$$\Sigma_k z_{i,j,k}^{(-)} \geq 1 \quad (13),$$

where $z^{(+)}_{i,j,k}$ and $z^{(-)}_{i,j,k}$ are values selected to be 0 or 1. With the constraints of formula (10), $z^{(+)}_{i,j,k}$ acts as a variable taking 1 when $\Delta F_k(x^{(i,j)})$ is positive and taking 0 when $\Delta F_k(x^{(i,j)})$ is negative. With the constraints of formula (11), $z^{(-)}_{i,j,k}$ acts as a variable taking 1 when $\Delta F_k(x^{(i,j)})$ is negative and taking 0 when $\Delta F_k(x^{(i,j)})$ is positive. The creating section may proceed with an operation of S280.

At S280, the creating section may further generate a sixth constraint based on the judgement representing the relative evaluation between the first subject and the second subject in the object pair. The relative evaluation includes one or more levels of difference of evaluation.

In an embodiment, the relative evaluation includes two levels: one is that the first subject is slightly superior to the second subject (which may be referred to as "first level"), the other is that the first subject is significantly superior to the second subject (which may be referred to as "second level"). In such an embodiment, the creating section may generate the sixth constraint represented by the following formula (14) for an object pair of subjects having a difference of the first level and the following formula (15) for an object pair of subjects having a difference of the second level:

$$z_0 \leq F_k(x^{(i)}) - F_k(x^{(j)}) + \sigma_{ij} \leq z_1 \text{ for each } k \in N \quad (14),$$

$$z_1 < F_k(x^{(i)}) - F_k(x^{(j)}) + \sigma_{ij} \text{ for each } k \in N \quad (15),$$

where $z_0$ and $z_1$ represent evaluation thresholds for the first level and the second level, and $\sigma_{ij}$ represents an error variable for the combination of the first subject i and the second subject j.

The creating section may not generate a constraint of formula (14) when the relative evaluation includes only one level. The creating section may generate a further constraint similar to formula (14) having a different set of evaluation thresholds (e.g., $(z_1, z_2)$, $(z_2, z_3)$, . . . ) when the relative evaluation includes three or more levels.

At S290, the creating section may determine whether a condition to end the iterations of operations of S230-S290. In one embodiment, the creating section may determine whether operations S230-S290 have been completed for all pairs of the plurality of pairs (e.g., P pairs) of metrics. If the condition is met, then the creating section may proceed with an operation of S295. If the condition is not met, then the generating section may go back to the operation of S230 to select a new pair, which has not been selected.

At S295, the creating section may create one or more objective functions by using a plurality of judgments for a plurality of subjects representing the relative evaluation of pairs of the subjects. The creating function may create one objective function (hereinafter referred to as "one objective function") for generating the one or more objective functions. The one objective function may be represented by the following formula (16):

$$\min \Sigma_{(i,j) \in P} |\sigma_{ij}| \quad (16).$$

In one embodiment, the creating section may optimize the one objective function by solving an integer programming problem including all or a part of constraints generated at the operations of S220-S290. The creating section may obtain a solution or approximate solution(s) of the integer programming problem by utilizing a solver (e.g., IBM ILOG CPLEX).

In the embodiment, by solving the integer programing problem, the creating section may obtain values of $w_{k,m}$ for $k \in N$ and $m \in M$, which may represent the one or more objective functions.

As described above, the creating apparatus may generate one or more objective functions based on the evaluation values of the metrics and information of the groups of metrics generated by the generating section. In other words, the creating section may generate the objective functions based on the evaluation values and the judgement of the comparability and the relative evaluation between the pairs of subjects.

The number of the objective functions created according to the embodiments described above may be less than the number of metrics themselves. This means that solutions derived from the objective functions are decreased from the conventional multi-objective optimization. Therefore, time and resources for handling all solutions are reduced, which may require less computational resources to derive the solutions, such as reduced memory usage and reduced processing consumption.

In addition, since the objective functions are generated from the viewpoint of comparability of the subjects, solutions of the objective functions of the embodiments may include solutions that are incomparable to other solutions, and that may be candidates for the optimized solutions. In other words, the generating apparatus of the embodiments may generate the objective functions by taking advantage of both the single-objective optimization and the multi-objective optimization without traditional disadvantages thereof.

In the above described embodiments, the judgements may be made by a single evaluator. In other embodiments, the judgements may be made by a plurality of evaluators. In some embodiments, judgements used for generation of groups and judgments used for creating of the objective functions may be different or at least partially the same.

In the above described embodiments, the objective functions comprise a weight for each metric such as represented by $F_k(x) = w_1 x_1 + w_3 x_3 + w_4 x_4$. In other embodiments, the objective function may include a plurality of basis functions and weights for each metric.

In the embodiments, the objective functions may be represented as: $F_k(x) = w_{k,1,1} \varphi_1(x_1) + w_{k,1,2} \varphi_2(x_1) + w_{k,1,3} \varphi_3(x_1) + w_{k,3,1} \varphi_1(x_3) + w_{k,3,2} \varphi_2(x_3) + w_{k,3,3} \varphi_3(x_3) + w_{k,4,1} \varphi_1(x_4) + w_{k,4,2} \varphi_2(x_4) + w_{k,4,3} \varphi_3(x_4)$, where $\varphi_l(x_m)$ represents the l-th basis function for the m-th metric, and $w_{k,m,l}$ represents a weight value for the m-th metric and the l-th basis function in the k-th objective function. $\varphi_l(x)$ may be selected from a variety of functions such as $ax+b$, $a(x-b)^2+c$, $a(x-b)^{1/2}+c$, $a/(x-b)+c$, $a \cdot \exp(-b(x-c)^2)+d$, or, $a/(b+c \cdot \exp(d(x-e)))$ where a, b, c, and d are predetermined constant values. In the embodiments, the creating section may further generate constraints for the basis functions. For example, the creating section may generate seventh constraints as represented by following formulae (17)-(19) instead of the formulae (6)-(8), and solve one objective function represented by a formula (20) instead of the formula (16):

$$F_k(x) = \Sigma_{m \in M} \Sigma_{l \in L_m} w_{k,m,l} \varphi_l(x_m) \text{ for each } k \in N \quad (17),$$

$$\Sigma_{m \in M} \Sigma_{l \in L_m} w_{k,m,l} = 1 \text{ for each } k \in N \quad (18),$$

$$0 \le w_{k,m,l} \le y_{k,m,l} \le y_{k,m} \text{ for each } \{(k,m,l) | k \in N, m \in M, l \in L_m\}, \quad (19),$$

$$\min \Sigma_{(i,j) \in P} |\sigma_{ij}| + \lambda \Sigma_{k \in N} \Sigma_{m \in M} \Sigma_{l \in L_m} y_{k,m,l} \quad (20),$$

where $L_m$ is the number of basis functions for the m-th metric.

The creating section may further generate constraints as represented by at least one of the following formulae (21)-(22):

$$\Sigma_{l \in L_m} y_{k,m,l} \le B_{k,m} \text{ for each } \{(k,m) | k \in N, m \in M\} \quad (21),$$

$$\Sigma_{l \in L_m} w_{k,m,l} \ge W_{k,m} \text{ for each } \{(k,m) | k \in N, m \in M\} \quad (22),$$

The constraint of the formula (21) may define an upper bound of the number of the basis function for each metric, thereby avoiding overtraining of the objective functions. The constraint of the formula (22) may define a lower bound of a total weight for each metric, thereby avoiding a situation where the objective function substantially ignores some metrics.

Figure 11:
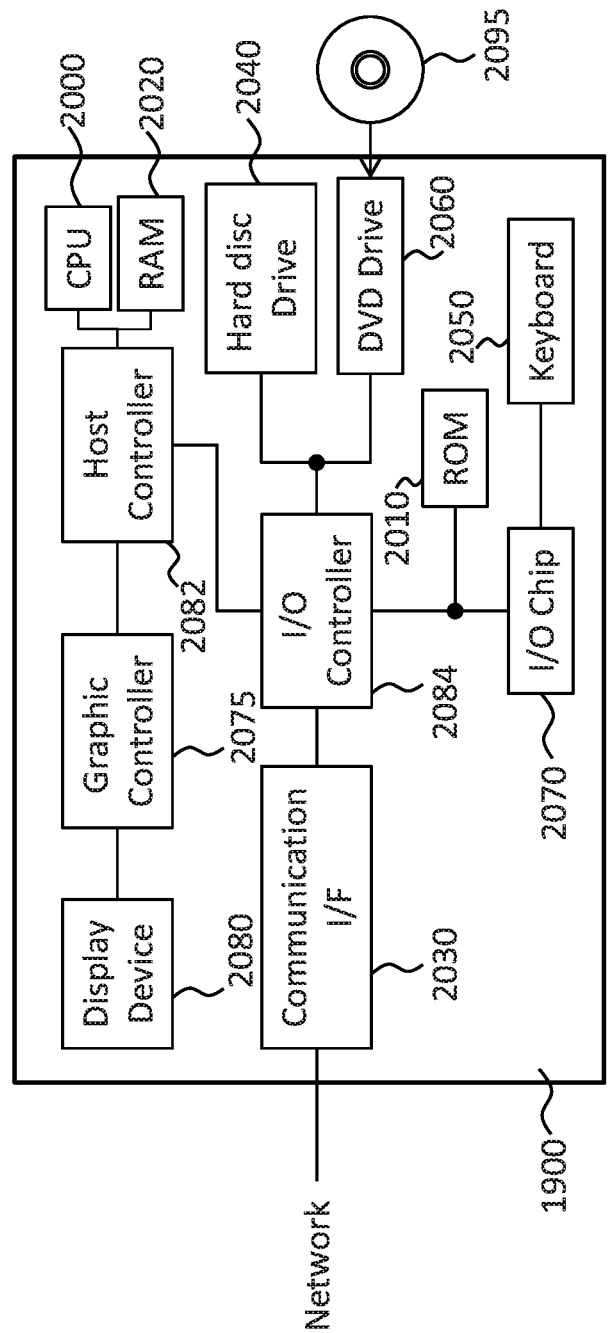
FIG. 11 shows an exemplary hardware configuration of a computer 1900 that functions as a system, according to an embodiment of the present invention.

FIG. 11 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the generating apparatus 10 of FIG. 1, includes an obtaining section, a comparing section, a storing section, a generating section, and a creating section. The program or module acts on the CPU 2000, to cause the computer 1900 to function as an obtaining section, a comparing section, a storing section, a generating section, and a creating section, such as the obtaining section 110, the comparing section 120, the storing section 140, the generating section 160, and the creating section 180 described above.

The information processing described in these programs is read into the computer 1900, to function as an obtaining section, a comparing section, a storing section, a generating section, and a creating section, which are the result of cooperation between the program or module and the abovementioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storing section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A generating apparatus comprising:
   a processor; and
   one or more computer readable mediums collectively including program code that, when executed by the processor, cause the processor to:
      obtain a judgment that represents whether a first subject is comparable to a second subject;
      obtain a plurality of evaluation values for each of the first subject and the second subject, each evaluation value corresponding to a metric among a plurality of metrics;
      compare, for each metric, a corresponding evaluation value of the first subject to a corresponding evaluation value of the second subject;
      generate one or more groups with a solver, to reduce a number of solutions to be handled by the processor without discarding evaluating subjects to reduce memory usage and processing consumption, based on a result of the comparison and the judgment, each group of the one or more groups including at least one metric of the plurality of metrics, wherein metrics in each group are determined to be comparable with respect to the evaluating subjects; and
      determine an optimal packing configuration for packing medical instruments in a container responsive the one or more groups, with the plurality of metrics including a filling rate, an aspect ratio, and a sterilization manageability.

2. The generating apparatus of claim 1, wherein the comparison includes calculating a plurality of differences between the plurality of evaluation values of the first subject and the plurality of evaluation values of the second subject.

3. The generating apparatus of claim 2, wherein the generation of one or more groups includes adding at least one pair of metrics in different groups in response to a condition that signs of differences corresponding to the at least one pair of metrics are different and the judgment indicates that the first subject is incomparable to the second subject.

4. The generating apparatus of claim 3, wherein the generation of one or more groups further includes generating a first constraint,
   wherein a total number of pairs of metrics in a group is not more than a number of combinations of a metric corresponding to a positive difference and a metric corresponding to a negative difference minus a minimum of the number of metrics corresponding to a positive difference and the number of metrics corresponding to a negative difference, and
   wherein each pair of metrics has a metric corresponding to a positive difference and a metric corresponding to a negative difference.

5. The generating apparatus of claim 4, wherein the generation of one or more groups further includes solving an integer programming problem including the first constraint.

6. The generating apparatus of claim 1, wherein the generation of one or more groups includes adding each metric corresponding to a difference having a first sign in a group with a metric corresponding to a difference having an opposite sign of the first sign in response to a condition that the judgment indicates that the first subject and the second subject are comparable.

7. The generating apparatus of claim 6, wherein the generation of one or more groups further includes generating, in response to a condition that the judgment indicates that the first subject is incomparable to the second subject, a second constraint,
   wherein, for each metric corresponding to a difference having the first sign, the total number of metrics in a group corresponding to a difference having an opposite sign of the first sign is not less than one, and
   wherein the first sign is one of positive and negative.

8. The generating apparatus of claim 7, wherein the generation of one or more groups further includes solving an integer programming problem including the second constraint.

9. The generating apparatus of claim 1, wherein the generation of one or more groups includes generating a third constraint,
   wherein a first metric and a second metric must be in a group if the first metric and the third metric are in the group, and
   wherein the second metric and the third metric are in the group.

10. The generating apparatus of claim 1, wherein the instructions further cause the processor to:
    create one or more objective functions, each objective function corresponding to a group among the one or more groups, and each objective function including each metric included in a corresponding group.

11. The generating apparatus of claim 10, wherein:
    the judgment further represents a relative evaluation between the first subject and the second subject in response to a condition that the first subject is comparable to the second subject; and
    the one or more objective functions are created by further using a plurality of the judgments for a plurality of subjects.

12. The generating apparatus of claim 10, wherein the creation of one or more objective functions includes generating a fourth constraint that, for all objective functions, differences of output values between the first subject and the second subject have the same sign.

13. The generating apparatus of claim 10, wherein the creation of one or more objective functions includes generating a fifth constraint that, a difference of output values between the first subject and the second subject for a first object function has an opposite sign to a difference of output values between the pair of subjects for a second objective function.

14. A computer implemented method comprising:
    obtaining a judgment that represents whether a first subject is comparable to a second subject;
    obtaining a plurality of evaluation values for each of the first subject and the second subject, each evaluation value corresponding to a metric among a plurality of metrics;
    comparing, for each metric, a corresponding evaluation value of a first subject to a corresponding evaluation value of the second subject;
    generating one or more groups with a solver, to reduce a number of solutions to be handled by the processor without discarding evaluating subjects to reduce memory usage and processing consumption, based on a result of the comparison and the judgment, each group of the one or more groups including at least one metric of the plurality of metrics, wherein metrics in each group are determined to be comparable with respect to the evaluating subjects; and
    determine an optimal packing configuration for packing medical instruments in a container responsive the one or more groups, with the plurality of metrics including a filling rate, an aspect ratio, and a sterilization manageability.

15. The method of claim 14, wherein the comparing includes calculating a plurality of differences between the plurality of evaluation values of the first subject and the plurality of evaluation values of the second subject.

16. The method of claim 15, wherein the generating one or more groups includes adding at least one pair of metrics in different groups in response to a condition that signs of differences corresponding to the at least one pair of metrics are different and the judgment indicates that the first subject is incomparable to the second subject.

17. The method of claim 16, wherein the generating of one or more groups further includes generating a first constraint,
    wherein a total number of pairs of metrics in a group is not more than a number of combinations of a metric corresponding to a positive difference and a metric corresponding to a negative difference minus a minimum of the number of metrics corresponding to a positive difference and the number of metrics corresponding to a negative difference, and
    wherein each pair of metrics has a metric corresponding to a positive difference and a metric corresponding to a negative difference.

18. The method of claim 17, wherein the generating one or more groups further includes solving an integer programming problem including the first constraint.

19. A computer program product comprising a computer readable storage medium having program instructions embodied therewith, the program instructions executable by a computer to cause the computer to perform operations comprising:
    obtaining a judgment that represents whether a first subject is comparable to a second subject;

obtaining a plurality of evaluation values for each of the first subject and the second subject, each evaluation value corresponding to a metric among a plurality of metrics;

comparing, for each metric, a corresponding evaluation value of a first subject to a corresponding evaluation value of the second subject;

generating one or more groups with a solver, to reduce a number of solutions to be handled by the processor without discarding evaluating subjects to reduce memory usage and processing consumption, based on a result of the comparison and the judgment, each group of the one or more groups including at least one metric of the plurality of metrics, wherein metrics in each group are determined to be comparable with respect to the evaluating subjects; and determine an optimal packing configuration for packing medical instruments in a container responsive the one or more groups, with the plurality of metrics including a filling rate, an aspect ratio, and a sterilization manageability.

20. The computer program product of claim 19, wherein the comparing calculates a plurality of differences between the plurality of evaluation values of the first subject and the plurality of evaluation values of the second subject.

21. The computer program product of claim 20, wherein the generating one or more groups includes adding at least one pair of metrics in different groups in response to a condition that signs of differences corresponding to the at least one pair of metrics are different and the judgment indicates that the first subject is incomparable to the second subject.

22. The computer program product of claim 21, wherein the generating of one or more groups further includes generating a first constraint,
   wherein a total number of pairs of metrics in a group, each pair of metrics having a metric corresponding to a positive difference and a metric corresponding to a negative difference is not more than a number of combinations of a metric corresponding to a positive difference and a metric corresponding to a negative difference minus a minimum of the number of metrics corresponding to a positive difference and the number of metrics corresponding to a negative difference, and
   wherein each pair of metrics has a metric corresponding to a positive difference and a metric corresponding to a negative difference.

23. The computer program product of claim 22, wherein the generating one or more groups further includes solving an integer programming problem including the first constraint.

24. A specific-purpose generating apparatus comprising:
   an obtaining circuit configured to obtain a judgment that represents whether a first subject is comparable to a second subject and a plurality of evaluation values for each of the first subject and the second subject, each evaluation value corresponding to a metric among a plurality of metrics;
   a comparing circuit configured to compare, for each metric, a corresponding evaluation value of a first subject to a corresponding evaluation value of the second subject; and
   a generating circuit configured to generate one or more groups, to reduce a number of solutions to be handled by the processor without discarding evaluating subjects to reduce memory usage and processing consumption, based on a result of the comparison and the judgment, each group of the one or more groups including at least one metric of the plurality of metrics, wherein metrics in each group are determined to be comparable with respect to the evaluating subjects.

25. A computer implemented method comprising:
   determining an optimal packing configuration for packing medical instruments in a container responsive to a plurality of metrics, the plurality of metrics including a filling rate, an aspect ratio, and a sterilization manageability, the determining including generating one or more groups with a solver, to reduce a number of solutions to be handled by the processor without discarding evaluating subjects to reduce memory usage and processing consumption, based on a result of a judgment, the judgement representing whether a first packing configuration is comparable to a second packing configuration, and a plurality of evaluation values for each of the first packing configuration and the second packing configuration, each evaluation value corresponding to one of the plurality of metrics, each group of the one or more groups including at least one of the plurality of metrics,
   wherein the at least one of the plurality of metrics in each group are determined to be comparable with respect to the evaluating packing configurations, based on a comparison, for each of the plurality of metrics, of evaluation values of the first packing configuration and the second packing configuration that correspond to one of the plurality of metrics.

* * * * *